US008666880B2

(12) United States Patent
Ang et al.

(10) Patent No.: US 8,666,880 B2
(45) Date of Patent: Mar. 4, 2014

(54) SYSTEM AND METHOD FOR FLEXIBLE PAYMENT TERMS

(75) Inventors: Mark Ang, Scottsdale, AZ (US); Boudhayan Choudhuri, Phoenix, AZ (US); Jessica Kaplan, New York, NY (US); David Lowy, New York, NY (US); Gyanesh Narayan, Scottsdale, AZ (US); Eric Nielsen, New York, NY (US); Christine Vega, South Orange, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 11/850,821

(22) Filed: Sep. 6, 2007

(65) Prior Publication Data

US 2008/0262919 A1 Oct. 23, 2008

Related U.S. Application Data

(60) Provisional application No. 60/912,314, filed on Apr. 17, 2007.

(51) Int. Cl.
*G06Q 40/00* (2012.01)

(52) U.S. Cl.
USPC .............................................. 705/38; 705/35

(58) Field of Classification Search
USPC .......................................................... 705/38
See application file for complete search history.

(56) References Cited

U.S. PATENT DOCUMENTS

| | | | |
|---|---|---|---|
| 4,232,367 A | 11/1980 | Youden et al. | |
| 4,507,745 A | 3/1985 | Agrawal | |
| 5,058,009 A | 10/1991 | Yoshino et al. | |
| 5,742,775 A | 4/1998 | King | |
| 5,765,144 A | 6/1998 | Larche et al. | |
| 5,832,461 A | 11/1998 | Leon et al. | |
| 5,878,404 A | 3/1999 | Stout, Jr. et al. | |
| 5,930,775 A | 7/1999 | McCauley et al. | |
| 5,933,817 A | 8/1999 | Hucal | |
| 5,970,478 A | 10/1999 | Walker et al. | |
| 5,987,436 A | 11/1999 | Halbrook | |
| 5,991,745 A | 11/1999 | Kiritz | |
| 6,006,207 A | 12/1999 | Mumick et al. | |
| 6,018,718 A | 1/2000 | Walker et al. | |

(Continued)

OTHER PUBLICATIONS

Wikipedia, 2013 "discounts and allowances".*

(Continued)

*Primary Examiner* — Kirsten Apple
(74) *Attorney, Agent, or Firm* — Snell & Wilmer L.L.P.

(57) ABSTRACT

A method is disclosed for offering transaction account consumers with payment term options to pay a minimum amount due early, defer payment into the following payment cycle, and pay a standard amount when due. When generating a periodic billing statement, the invention determines a consumer's eligibility to elect early payment, deferred payment, and regular payment. When a consumer is eligible for early payment, a received payment is compared to a discount rate tier, then a discount amount is calculated and credited to the consumer's account. When the consumer is eligible for deferred payment, the system calculates a new current minimum payment due by multiplying the current non-deferred balance by a predetermined percentage amount and adding the result to the deferred balance. When the consumer is not eligible for deferred payment, the system calculates a new current minimum due by summing the current non-deferred balance with the deferred balance.

19 Claims, 4 Drawing Sheets

(56) References Cited

U.S. PATENT DOCUMENTS

| | | | |
|---|---|---|---|
| 6,032,136 A | 2/2000 | Brake, Jr. et al. | |
| 6,038,550 A | 3/2000 | Rosenwald | |
| 6,049,782 A | 4/2000 | Gottesman et al. | |
| 6,052,673 A | 4/2000 | Leon et al. | |
| 6,064,987 A | 5/2000 | Walker et al. | |
| 6,067,533 A | 5/2000 | McCauley et al. | |
| 6,070,153 A | 5/2000 | Simpson | |
| 6,148,293 A | 11/2000 | King | |
| 6,269,347 B1 | 7/2001 | Berger | |
| 6,275,807 B1 | 8/2001 | Schirripa | |
| 6,298,335 B1 | 10/2001 | Bernstein | |
| 6,304,858 B1 | 10/2001 | Mosler et al. | |
| 6,315,196 B1 | 11/2001 | Bachman | |
| 6,324,524 B1 | 11/2001 | Lent et al. | |
| 6,330,548 B1 | 12/2001 | Walker et al. | |
| 6,535,856 B1 | 3/2003 | Tal | |
| 6,629,081 B1 | 9/2003 | Cornelius et al. | |
| 6,631,358 B1 | 10/2003 | Ogilvie | |
| 7,021,530 B2 | 4/2006 | Hoch | |
| 7,086,586 B1 | 8/2006 | Sullivan | |
| 7,318,046 B1 | 1/2008 | Wellons et al. | |
| 2001/0051919 A1* | 12/2001 | Mason | 705/40 |
| 2002/0046105 A1 | 4/2002 | Gardenswartz et al. | |
| 2002/0091634 A1 | 7/2002 | Eubanks | |
| 2002/0116266 A1 | 8/2002 | Marshall | |
| 2003/0061097 A1 | 3/2003 | Walker et al. | |
| 2003/0064788 A1 | 4/2003 | Walker et al. | |
| 2003/0105689 A1 | 6/2003 | Chandak et al. | |
| 2004/0064422 A1 | 4/2004 | Leon | |
| 2004/0243468 A1 | 12/2004 | Cohagan et al. | |
| 2005/0027654 A1 | 2/2005 | Adrian | |
| 2005/0055272 A1 | 3/2005 | Ryan et al. | |
| 2005/0127157 A1 | 6/2005 | Stemmle et al. | |
| 2005/0144130 A1 | 6/2005 | Staniar et al. | |
| 2005/0228750 A1 | 10/2005 | Olliphant et al. | |
| 2005/0283437 A1* | 12/2005 | McRae et al. | 705/40 |
| 2006/0031158 A1 | 2/2006 | Orman | |
| 2006/0178987 A1 | 8/2006 | Ostergren | |
| 2006/0259364 A1 | 11/2006 | Strock et al. | |
| 2006/0282375 A1 | 12/2006 | Stone | |
| 2007/0005464 A1 | 1/2007 | Rosenblatt et al. | |
| 2007/0083459 A1 | 4/2007 | Eubanks | |
| 2007/0100719 A1 | 5/2007 | Chwast | |
| 2007/0129955 A1 | 6/2007 | Dalmia et al. | |
| 2008/0077498 A1 | 3/2008 | Ariff et al. | |
| 2008/0082407 A1 | 4/2008 | Georgiadis et al. | |
| 2008/0086396 A1 | 4/2008 | Hahn-Carlson | |
| 2008/0154769 A1 | 6/2008 | Anderson et al. | |
| 2008/0249941 A1 | 10/2008 | Cooper | |
| 2008/0255973 A1 | 10/2008 | El Wade et al. | |
| 2008/0270293 A1 | 10/2008 | Fortune et al. | |
| 2009/0030776 A1 | 1/2009 | Walker et al. | |
| 2009/0089193 A1 | 4/2009 | Paintin | |
| 2009/0177563 A1 | 7/2009 | Bernstein et al. | |
| 2010/0042491 A1 | 2/2010 | Halleck et al. | |
| 2010/0088149 A1 | 4/2010 | Sullivan et al. | |
| 2010/0145855 A1 | 6/2010 | Fordyce et al. | |

OTHER PUBLICATIONS

International Search Report and Written Opinion for International Application No. PCT/US2008/56547 dated Jun. 1, 2009.
USPTO; Final Office Action dated Apr. 13, 2010 in U.S. Appl. No. 121486,988.
USPTO; Advisory Action dated Jun. 23, 2010 in U.S. Appl. No. 12/486,988.
USPTO; Office Action dated Jul. 29, 2011 in U.S. Appl. No. 12/496,394.
USPTO; Office Action dated Jul. 29, 2011 in U.S. Appl. No. 12/546,448.
USPTO; Office Action dated Aug. 31, 2011 in U.S. Appl. No. 12/546,476.
USPTO; Office Action dated Jul. 29, 2011 in U.S. Appl. No. 12/546,487.
USPTO; Office Action dated Sep. 2, 2011 in U.S. Appl. No. 12/546,509.
USPTO; Office Action dated Sep. 2, 2011 in U.S. Appl. No. 12/546,524.
USPTO; Office Action dated Aug. 17, 2011 in U.S. Appl. No. 12/546,541.
USPTO; Office Action dated Oct. 13, 2011 in U.S. Appl. No. 12/546,550.
USPTO; Office Action dated Oct. 13, 2011 in U.S. Appl. No. 12/546,570.
USPTO; Office Action dated Aug. 17, 2011 in U.S. Appl. No. 12/546,575.
USPTO; Office Action dated Oct. 13, 2011 in U.S. Appl. No. 12/546,584.
USPTO; Advisory Action dated Mar. 30, 2012 in U.S. Appl. No. 12/496,394.
USPTO; Advisory Action dated Mar. 20, 2012 in U.S. Appl. No. 12/546,448.
USPTO; Advisory Action dated May 25, 2012 in U.S. Appl. No. 12/546,476.
USPTO; Final Office Action dated Apr. 26, 2012 in U.S. Appl. No. 12/546,487.
USPTO; Final Office Action dated May 10, 2012 in U.S. Appl. No. 12/546,509.
USPTO; Final Office Action dated May 10, 2012 in U.S. Appl. No. 12/546,541.
USPTO; Final Office Action dated Apr. 5, 2012 in U.S. Appl. No. 12/546,550.
USPTO; Final Office Action dated Mar. 15, 2012 in U.S. Appl. No. 12/546,570.
USPTO; Advisory Action dated May 24, 2012 in U.S. Appl. No. 12/546,570.
USPTO; Advisory Action dated Mar. 29, 2012 in U.S. Appl. No. 12/546,575.
USPTO; Final Office Action dated Jan. 27, 2012 in U.S. Appl. No. 12/496,394.
USPTO; Final Office Action dated Jan. 9, 2012 in U.S. Appl. No. 12/546,448.
USPTO; Final Office Action dated Jan. 11, 2012 in U.S. Appl. No. 12/546,476.
USPTO; Final Office Action dated Jan. 9, 2012 in U.S. Appl. No. 12/546,575.
Non-Final Office Action mailed Oct. 7, 2007 in U.S. Appl. No. 12/486,988.
USPTO; Office Action dated Jul. 26, 2012 in U.S. Appl. No. 12/486,965.
USPTO; Office Action dated Jul. 27, 2012 in U.S. Appl. No. 12/486,988.
USPTO; Advisory Action dated Jul. 12, 2012 in U.S. Appl. No. 12/546,509.
USPTO; Office Action dated Aug. 30, 2012 in U.S. Appl. No. 13/532,534.
USPTO; Advisory Action dated Jul. 18, 2012 in U.S. Appl. No. 12/546,541.
USPTO; Advisory Action dated Jun. 7, 2012 in U.S. Appl. No. 12/546,550.
USPTO; Office Action dated Aug. 28, 2012 in U.S. Appl. No. 13/533,891.
USPTO; Notice of Allowance dated Oct. 30, 2012 in U.S. Appl. No. 12/486,965.
USPTO; Final Office Action dated Jan. 15, 2013 in U.S. Appl. No. 12/546,584.
USPTO; Final Office Action dated Aug. 29, 2013 in U.S. Appl. No. 12/546,476.
USPTO; Office Action dated Jul. 15, 2013 in U.S. Appl. No. 13/532,534.
USPTO; Office Action dated Jul. 15, 2013 in U.S. Appl. No. 13/533,891.
USPTO; Office Action dated Jun. 18, 2013 in U.S. Appl. No. 12/496,394.
USPTO; Office Action dated May 22, 2013 in U.S. Appl. No. 12/546,476.

(56) References Cited

OTHER PUBLICATIONS

USPTO; Advisory Action dated Apr. 24, 2013 in U.S. Appl. No. 13/532,534.
USPTO; Office Action dated Jun. 20, 2013 in U.S. Appl. No. 12/546,550.
USPTO; Office Action dated Jun. 19, 2013 in U.S. Appl. No. 12/546,570.
USPTO; Office Action dated May 28, 2013 in U.S. Appl. No. 12/546,575.
USPTO; Advisory Action dated Apr. 26, 2013 in U.S. Appl. No. 13/533,891.
USPTO; Final Office Action dated Feb. 12, 2013 in U.S. Appl. No. 12/486,988.
USPTO; Final Office Action dated Feb. 21, 2013 in U.S. Appl. No. 13/532,534.
USPTO; Advisory Action dated Mar. 13, 2013 in U.S. Appl. No. 12/546,584.
USPTO; Final Office Action dated Feb. 21, 2013 in U.S. Appl. No. 13/533,891.

* cited by examiner

SYSTEM AND METHOD FOR FLEXIBLE PAYMENT TERMS

CROSS REFERENCE TO RELATED APPLICATIONS

This application claims priority to, and the benefit of, U.S. Provisional Application Ser. No. 60/912,314, filed Apr. 17, 2007 and entitled "System and Method for Flexible Payment Terms", which is hereby incorporated by reference in its entirety.

FIELD OF INVENTION

The present invention generally relates to providing payment terms for a transaction account, and more particularly, to enabling consumers having a line of credit to choose to pay early to receive a discount, defer payment without interest, or submit a regularly scheduled payment according to the original terms.

BACKGROUND OF THE INVENTION

Various programs have been established to enable consumers and businesses to conveniently and timely facilitate purchases based on a line of credit. Consumers may enjoy some tangible value from utilizing a cash-back card, or a interest-free revolving credit card. However, such cards often include only one feature and/or the interest-free benefit is limited to a short-term, namely only 12-15 months of no interest. In contrast, recent research has demonstrated that choice and flexibility provide a much greater tangible value for a segment of small business consumers, and a value that is not being provided today by transaction card companies.

Improved cash flow management is a core need of any consumer and small business. There are many financial tools that exist to help small businesses and consumers with cash flow management (e.g. lines of credit, promotional periods on credit cards, loans etc.). However, none of these products sufficiently combine these features on a transaction card in a manner which provides easy accessibility and broad scale reach. As such, a need exists for a line of credit that combines the features of existing financial tools to provide the level of payment flexibility that is often desirable when considering the uncertainties typically associated with small business administration.

SUMMARY OF THE INVENTION

The invention provides consumers with payment term options for their transaction accounts. In general, a consumer may choose to pay a periodic payment early to receive a payment discount, defer a payment until the next payment cycle without incurring additional interest and fees, or submit a payment in accordance with the standard transaction account requirements.

When receiving a payment according to an early payment term, in one embodiment, the method comprises: receiving a payment from the consumer in response to a billing statement; determining when the payment is an early payment based on an early payment date; retrieving a discount rate, wherein the discount rate is determined by comparing an amount of the early pay eligible spend to an early payment tier; calculating an early payment credit based on the early pay eligible spend and the discount rate; and, posting the early payment credit to an account of the consumer.

When receiving a payment according to a deferred payment term, in one embodiment, the method comprises receiving an election for the deferred payment term from the consumer in response to a billing statement; determining when the election does not exceed a predetermined number of available deferred payments to determine when the consumer is eligible for the deferred payment; moving a non-deferred balance to a deferred balance when the non-deferred balance is greater than zero and an account of the consumer is current; calculating a new current defer pay option (i.e., an amount the consumer is able to defer on the next billing cycle) based on the deferred balance and a new non-deferred balance; and, incrementing a deferred payment counter.

When posting a payment according to the deferred payment term, in one embodiment, the method comprises receiving a transaction; determining a type of the transaction; adding an amount of the transaction to an outstanding balance, when the type is a debit; offsetting an account balance starting with a delinquency with the amount of the transaction, when the type is a credit; and, offsetting an account balance starting with a delinquency with the amount of the transaction, when the type is a payment.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description herein is presented for purposes of illustration only and not of limitation. For example, the steps recited in any of the method or process descriptions may be executed in any order and are not limited to the order presented. For the sake of brevity, conventional data networking, application development and other functional aspects of the systems (and components of the individual operating components of the systems) may not be described in detail herein.

The invention includes a unique combination of one or more features associated with a transaction card. The invention allows the flexibility to choose certain optional payment terms each month or during any other pre-defined, random, periodic or other time period. The consumer, host, issuer, acquirer, merchant and/or any other entity may be able to chose the payment term. In one embodiment, the payment terms include an early payment discount, a defer payment term with a deferral fee (but without an interest charge) and a standard payment term.

Figure 1:
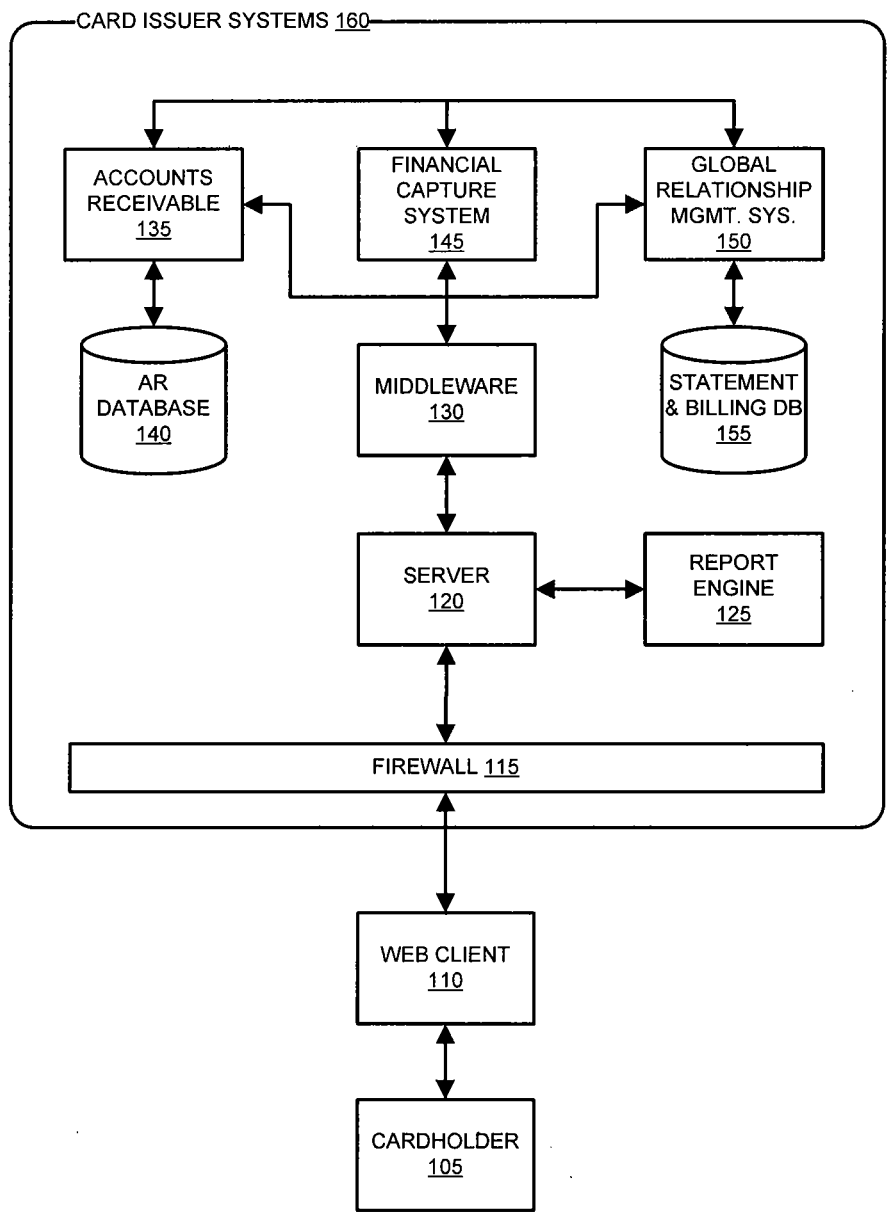
FIG. 1 is a block diagram illustrating major system components for accepting and processing payment term options, in accordance with an exemplary embodiment of the present invention.

With reference to FIG. 1, system 100 facilitates interaction between a consumer 105 and the Card Issuer Systems (CIS) 160 through, in one embodiment, a web client 110 with a network connection to an Internet server 120 by way of the Internet. In one embodiment, Internet server 120 may employ an authentication server in order to validate credentials, assign proper permissions, and retrieve preferences information for authorized consumers of CIS 160. In another embodiment, Internet server 120 may employ an application server to manage various applications and utilities that are utilized by the system. In still another embodiment, Internet server 120 interacts directly with the various systems and components disclosed herein. System 100 may include any number of computing platforms and databases that may be commonly found within a typical transaction account environment (e.g., American Express®). Such systems may include, for example, an accounts receivable system, accounts receivable database 140, a financial capture system 145, a global relationship management system 150, and a statement and billing database 155. Other systems may include, for example, new accounts systems, management information systems, business information systems, and the like. Each of the systems may be interconnected within by a network, as will be described herein. A middleware server and/or application 130 may serve as an intermediary between the various systems to ensure appropriate communications between disparate platforms. A report engine 125 retrieves and/or is provided with data from the various systems in order to generate billing statements, reports, and the like.

In addition to the components described above, CIS 160 or any other components discussed herein may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more of the components of system 100 may be embodied as a customization of an existing system, an add-on product, upgraded software, a stand alone system (e.g., kiosk), a distributed system, a method, a data processing system, a device for data processing, and/or a computer program product. Accordingly, individual system 100 components may take the form of an entirely software embodiment, an entirely hardware embodiment, or an embodiment combining aspects of both software and hardware. Furthermore, individual system 100 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The invention contemplates uses in association with web services, utility computing, pervasive and individualized computing, security and identity solutions, autonomic computing, commodity computing, mobility and wireless solutions, open source, biometrics, grid computing and/or mesh computing.

Consumer 105 may include any individual, group of individuals, charity, cardholder, business, entity, government organization, software and/or hardware that utilizes system 100. Consumer may also include anyone who applied for the account, currently has the card in her possession, has proxy or other rights to use or maintain the account, is partially or fully responsible to pay the charges on the account and/or the like. Consumer 105 may include a consumer who uses an account code without any physical card, uses a transponder, and/or uses a physical transaction card, to purchase items which are billed on the billing statement discussed herein. Consumer may also select payment terms relating to a revolving line of credit account, submit payments, and/or view billing statements. Consumer 105 may be, for example, an American Express® card member who elects a payment term in accordance with the present invention. In another embodiment, consumer 105 may be a consumer service representative or the like who interacts with system 100 to provide account information and configure payment terms or terms on behalf of a transaction account holder. In either embodiment, consumer 105 may interface with CIS 160 via any communication protocol, device or method discussed herein or known in the art. In one embodiment, consumer 105 may interact with CIS 160 by way of an Internet browser at a web client 110.

Web client 110 comprises any hardware and/or software suitably configured to facilitate input, receipt and/or review of information relating to merchants that are selected based on a search term entered into a search engine such as, for example, Google™, Yahoo™, MSN™, AOL™, and/or any other Internet-wide or web site centric search engines. Web client 110 includes any device (e.g., personal computer) which communicates (in any manner discussed herein) with CIS 160 via any network discussed herein. Such browser applications comprise Internet browsing software installed within a computing unit or system to conduct online transactions and/or communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 110 may or may not be in direct contact with CIS 160. For example, web client 110 may access the services of CIS 160 through another server, which may have a direct or indirect connection to Internet server 120.

As those skilled in the art will appreciate, web client 110 includes an operating system (e.g., Windows NT, 95/98/2000, OS2, UNIX, Linux, Solaris, MacOS, etc.) as well as various conventional support software and drivers typically associated with computers. Web client 110 may include any suitable personal computer, network computer, workstation, mini-computer, mainframe or the like. Web client 110 can be in a home or business environment with access to a network. In an exemplary embodiment, access is through a network or the Internet through a commercially available web-browser software package.

Web client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Web client 110 may include any number of applications, code modules, cookies, and the like to facilitate interaction with CIS 160 in order to, for example, view statements, view payment terms, view spend information, elect a payment term, submit/authorize a payment, and the like. In one embodiment, web client 110 may store consumer 105 preferences and/or any other information disclosed herein on a hard drive or any other local memory device. Accordingly, web client 110 may retrieve and store consumer information within a memory structure of web client 110 in the form of a browser cookie, for example. In another embodiment, web client 110 retrieves information relating to consumer 105 from CIS 160 on establishing a session with server 120.

Firewall 115, as used herein, may comprise any hardware and/or software suitably configured to protect CIS 160 components from users of other networks. Firewall 115 may reside in varying configurations including stateful inspection, proxy based and packet filtering among others. Firewall 115 may be integrated as software within Internet server 120, any other CIS 160 components or may reside within another computing device or may take the form of a standalone hardware component.

Server 120 may include any hardware and/or software suitably configured to facilitate communications between web client 110 and one or more CIS 160 components. Further, server 120 may be configured to transmit data to web client 110 within markup language documents. As used herein, "data" may include encompassing information such as commands, queries, files, data for storage, and/or the like in digital or any other form. Server 120 may operate as a single entity in a single geographic location or as separate computing components located together or in separate geographic locations.

Server 120 may provide a suitable web site or other Internet-based graphical user interface which is accessible by consumers. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Middleware 130 may include any hardware and/or software suitably configured to facilitate communications and/or process transactions between disparate computing systems. Middleware components are commercially available and known in the art. Middleware 130 may be implemented through commercially available hardware and/or software, through custom hardware and/or software components, or through a combination thereof. Middleware 130 may reside in a variety of configurations and may exist as a standalone system or may be a software component residing on the server 120. Middleware 130 may be configured to process transactions between the various components of CIS 160 and any number of internal or external issuer systems 100 for the purposes disclosed herein.

In order to control access to any component of CIS 160, server 120 may invoke an authentication server (not shown) in response to consumer 105 submissions of authentication credentials received at server 120 from web client 110. The authentication server may include any hardware and/or software suitably configured to receive authentication credentials, encrypt and decrypt credentials, authenticate credentials, and grant access rights according to pre-defined privileges attached to the credentials. The authentication server may grant varying degrees of application and data level access to users based on information stored within a database and/or any other known memory structure.

AR database 140 and statement and billing database 155 may include any hardware and/or software suitably configured to facilitate storing data relating to, for example, transactions, statements, amounts owed, payments, payment type election, identification, authentication credentials, consumer permissions, consumer preferences, and the like. One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 90 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system includes any of various suitable security features, such as firewalls, access codes, encryption, decryption, compression, decompression, and/or the like.

In addition to those described above, the various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards And Protocols (1998); Java 2 Complete, various authors, (Sybex 1999); Deborah Ray And Eric Ray, Mastering Html 4.0 (1997); and Loshin, TCP/IP Clearly Explained (1997) and David Gourley and Brian Totty, HTTP, The Definitive Guide (2002), the contents of which are hereby incorporated by reference.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 90 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 90 may employ any number of conventional techniques for data transmission, signaling, data processing, network control, and/or the like. Still further, system 90 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

System 100 enables consumer 105 (e.g., small business consumer), to improve cash-flow management by utilizing a single financial instrument, such as a charge card. System 100 combines unique payment features within one, singular product. Consumer 105 can utilize these cash flow management tools for all of their purchases at any merchant/vendor that accepts a particular transaction account.

As will be disclosed in greater detail herein, system 100 enables consumers 105 to elect a charge card payment term according the needs/preferences of the business and/or in response to specific incentives offered by the card issuer relating to payment terms. While disclosed herein in terms of a business charge card, practitioners will appreciate that the present invention may be equally applicable to other types of transaction accounts and/or lines of credit with minimal or no modification to the disclosed systems and processes.

With reference to FIG. 2, system 100 may use the disclosed routines to appropriately process early payments. Practitioners will appreciate that system 100 may incorporate many commonly implemented accounting processes relating to, for example, maintaining accounts receivables and accounts payables. Therefore, such processes will not be discussed in detail herein.

At the close of a predefined cycle for a transaction account, system 100 generates a billing statement based on a number of factors associated with consumer transactional activities. The statement may include, for example, cycle start date, cycle end date, transaction date, merchant identifier, transaction amount, accrued interest, fees, account balance, available credit limit, total amount due, due date, and the like. The statement may be provided to the consumer online (e.g., email, accessible from a link, accessible at a website, sent to a PDA, etc) or in paper form, or via fax, mail or any other means known in the art. The consumer 105 may submit a payment to CIS 160 via a check, cash, transfer of funds from another account, electronically by submitting a bank account number via an Automated Clearing House (ACH), or any other means known in the art.

The statement may further include instructions regarding payment terms along with check boxes corresponding to each payment term. In another embodiment, consumer 105 may establish a connection with CIS 160 by way of web client 110 to view a billing statement online. An interface is provided as disclosed herein, whereby consumer 105 may select a payment term. Consumer may also provide a payment term to CIS 160 via billing statement stub, internet website, interactive voice response system and consumer service representative.

When selecting a payment term, consumer 105 may choose to pay an amount due earlier than the standard payment timeframe, in order to receive an Early Pay Discount. The Early Payment Discount allows consumer 105 to pay a new balance in full by a pre-established early pay date to receive a discount off the current billed charges and may be awarded via a statement credit. Discounts may be supported from 0% through 100% and may be tiered. Such tiers may be based on, for example, a payment amount, a spend amount, a payment date, a merchant identifier, an industry code, a location or region associated with a purchase, a transaction amount, a spend trend, a merchant relationship, the status of the consumer, the status of an account, an affiliation with an organization, a product held by the consumer, the timing of a payment, time period for a purchase, a payment method, participation in a program, the length of relationship between the consumer and an account, and a credit rating of the consumer. In another embodiment, a tier may be determined according to a flat percent discount for any amount of spend. In another embodiment, the Early Pay Discount may be awarded in the form of loyalty points, prizes, rewards, gifts, packages, opportunities, adventure trips, entertainment, meetings with special people, special access passes, sporting events, cultural events, discounts on classifications of items, discounts on specific items, discounts on specific vendors, discounts within a defined geographical area, discounts within a consortium of merchants, and/or the like.

In one embodiment, when CIS 160 receives an election for Early Payment Discount from consumer 106, CIS 160 determines if the expected credit is greater than zero (204). If the expected credit is not greater than zero, then CIS 160 calculates eligible spend (210) for the next cycle Early Payment credit. Specifically, CIS 160 takes into consideration current spend data in light of net suspense and Early Pay credits in order to determine a consumer's available spend for the next cycle. Net suspense is derived from subtracting a decrease of the consumer's suspended balance from an increase of the consumer's suspended balance. A suspended balance is any balance that is under dispute by a consumer 105. A suspended balance is not eligible for finance charges and is not due until the dispute is resolved. In one embodiment, the calculation may appear as follows:

(net cycle-to-date purchase activity)−(net suspense)+
(early pay credits−early pay debits)

Thus, the above calculation may be used by CIS 160 to determine the amount of spend in which consumer 105 is eligible during the next credit cycle, as to not exceed a predetermined amount. However, practitioners will appreciate that the invention may use any number of various calculations and variables to determine an optimal spend availability in accordance with the present invention.

If the expected credit is greater than zero (step 204), then the system determines whether the selected payment term option is for Early Payment (206). If Early Payment is not selected by consumer 105, then CIS 160 calculates eligible spend (210) for the next cycle Early Payment credit as described above. However, if consumer 105 selects the Early Payment term, then the expected credit amount is posted as Early Payment credit (step 208). In one embodiment CIS 160 adds the credit amount to a cycle-to-date field within statement and billing database 155. The cycle-to-date amount may include issued Early Payment credits, year-to-date credits, and credits earned over consumer's participation in the program. CIS 160 further calculates eligible spend (210) for the next cycle Early Payment credit as described above.

Practitioners will appreciate that transaction account issuers use a variety of methods to determine spend limits for consumers. Some assign an overall spend limit associated with a particular charge card account. In other words, the consumer may spend any amount in a given month as long as the spend amount falls within the overall credit limit. Other card issuers assign a monthly spend limit that is based on a number of factors relating to the consumer such as, for example, credit rating, spending trends, payment history, length of time as a consumer, and the like. In some instances, the spend limit, or cap, may fluctuate during any time period based on these and other factors. Therefore, at the end of each cycle, the account issuer may use any number of calculations to determine a spend cap to be placed on the next cycle. In other instances, a spend cap is more static in nature and may be subject to periodic review and adjustment by the card issuer.

If, in step 210, CIS 160 calculates an eligible spend that exceeds a consumer's monthly cap (step 212), then the eligible spend amount is replaced by the monthly cap (step 214). In one embodiment, the CIS 160 awards Early Pay credits based on tiers. Such tiers may have associated therewith, a discount rate that is based on any number of factors such as, for example, an eligible spend amount. In one embodiment, CIS 160 determines a tier breakpoint to which the consumer 105 spend amount corresponds (step 216). An Early Pay credit may then be calculated by multiplying the tier's discount rate by the eligible spend (step 216). In another embodiment, other factors may be considered for the calculation of an Early Pay discount rate. For example, a card issuer may partner with an airline for promotions. As such, CIS 160 may factor in an amount of consumer spend with the partnered airline to issue an even higher Early Pay discount. Other spend factors may include, for example, classifications of items, specific items, specific vendors, a defined geographical area, a consortium of merchants, a payment amount, a spend amount, a payment date, a merchant identifier, an industry code, a location or region associated with a purchase, a transaction amount, a spend trend, a merchant relationship, the status of the consumer, the status of an account, an affiliation with an organization, a product held by the consumer, a timing of a payment, time period for a purchase, a payment method, a participation in a program, the length of a relationship between the consumer and the account, and a credit rating of the consumer.

CIS 160 also determines the dates that payments should be sent and received in order to qualify consumer 105 for Early Pay credits for the next cycle (step 218). In one embodiment, an Early Pay eligibility date may be static in that it does not fluctuate from month-to-month. For example, the card issuer may simply require that payment must be received on or before the fifth business day prior to the regular payment due date. In another embodiment, the card issuer may base the Early Pay eligibility date on factors that may change periodically. For example, the Early Pay eligibility date may be based on the amount of spend during the previous cycle, the amount of Early Pay discount applied to the account during the previous cycle, a previous payment date, a previous payment amount, an account balance, a payment history, a spend amount, a payment date, a merchant identifier, an industry code, a location or region associated with a purchase, a transaction amount, a spend trend, a merchant relationship, the status of the consumer, the status of an account, an affiliation with an organization, a product held by the consumer, a timing of a payment, time period for a purchase, a payment method, a participation in a program, the length of a relationship between the consumer and the account, and a credit rating of the consumer.

The amount that consumer 105 must spend may be based on any number of factors such as, for example, the consumers account balance, the total spend from the previous cycle, overall transaction history, payment history, credit rating, and the like. In one embodiment, CIS 160 calculates the balance that consumer 105 must spend to receive an Early Pay discount by subtracting suspense from the total outstanding balance (step 220). CIS 160 stores billed values (step 222) within a historical Early Pay database table of statement and billing database 155. Moreover, billed values may be stored within cycle-to-date fields in an unbilled early pay table.

Figure 2A:
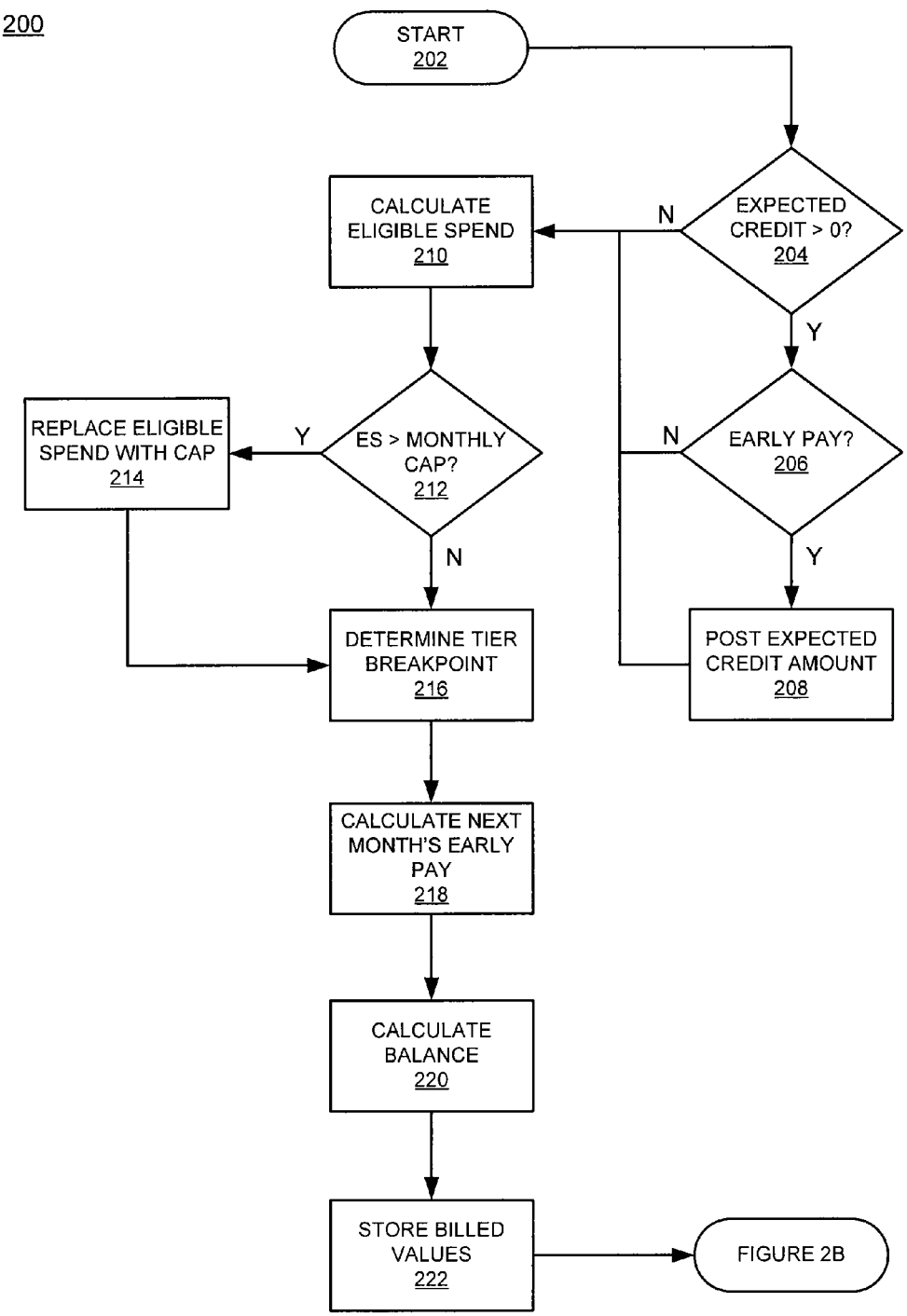
FIGS. 2A-2B are flow charts illustrating an exemplary process for end of cycle processing of early and deferred payments, in accordance with an exemplary embodiment of the present invention; and, FIG. 3 is flow chart illustrating an exemplary posting process relating to a deferred payment term option, in accordance with an exemplary embodiment of the present invention.
Figure 2B:
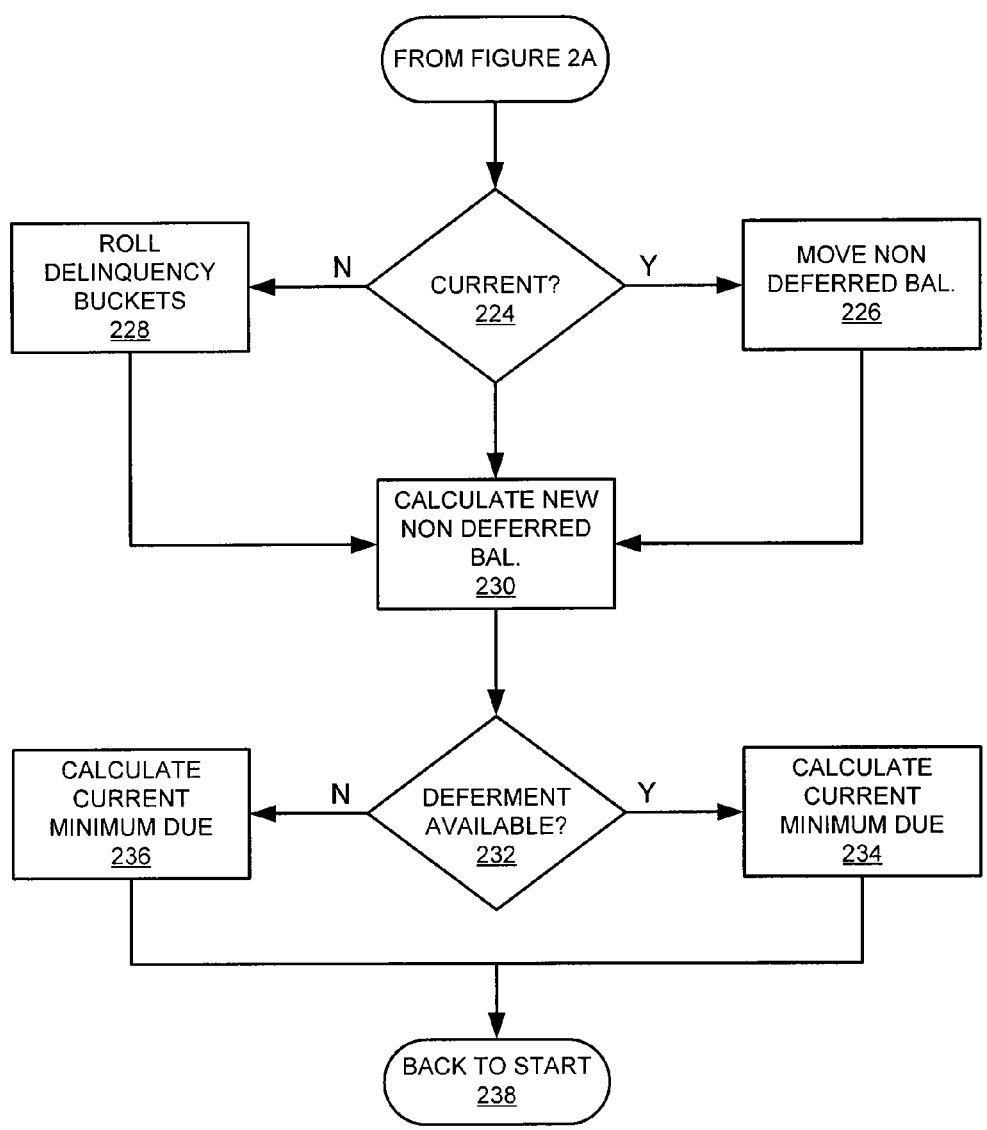

The Defer Payment term enables consumer 105 to defer payment on new billed charges interest and penalty-free (or reduced) until the next billing cycle due date. This option may support a partial payment of 0 to 99%, or no partial payment. With reference to FIG. 2B, in one embodiment, statement processing proceeds to step 224 when consumer 105 elects to defer payment. CIS 160 determines whether the previous amount due has been paid (step 224). If the minimum due has not been paid, then current non-deferred and deferred balances are moved to a thirty-days past due table. If the account is current, then CIS 160 determines whether the non-deferred current balance is not equal to zero. If this is the case, then the non-deferred current balance is removed to a deferred balance and a deferment counter is incremented (step 226). In one embodiment, consumer 105 may be allowed to defer a balance a limited number of times. For instance, the card issuer may determine that all consumers are limited to three payment deferments in a calendar year. In another embodiment, the number of available deferments may be limited by factors relating to the consumer such as, for example, account balance, payment history, credit rating, exceeding monthly spending limits, and the like.

CIS 160 calculates a new non-deferred balance (step 230) by subtracting a deferred balance, a delinquent due, and suspense from the total account outstanding balance. As explained above, deferment may be limited, thus the system determines whether a deferment is eligible (step 232). If no deferment is available, then CIS 160 calculates the current minimum payment due (step 236) by adding the current non-deferred balance to the deferred balance and the account is flagged as ineligible for deferment. However, if a deferment is available, then CIS 160 calculates the current minimum payment due by multiplying the current non-deferred balance by a predetermined percentage amount and adding the result to the deferred balance and multiplying the sum by a fee amount.

The optional fee amount charged to the consumer may be any fixed amount or percentage that the card issuer determines to be appropriate. In on embodiment, the fee amount is fixed across consumers. In another embodiment, the fee may be determined on a case-by-case basis and may consider factors such as, for example, account balance, payment history, credit rating, exceeding monthly spending limits, a payment amount, a spend amount, a payment date, a merchant identifier, an industry code, a location or region associated with a purchase, a transaction amount, a spend trend, a merchant relationship, the status of the consumer, the status of an account, an affiliation with an organization, a product held by the consumer, a timing of a payment, time period for a purchase, a payment method, a participation in a program, the length of a relationship between the consumer and the account, and a credit rating of the consumer. According to the fixed fee embodiment, the current minimum due may be calculated by adding the current non-deferred balance, the deferred balance, and fee amount. When the payment processing depicted in FIGS. 2A and 2B is complete for a given consumer, then CIS 160 returns to process the next statement (step 202).

Figure 3:
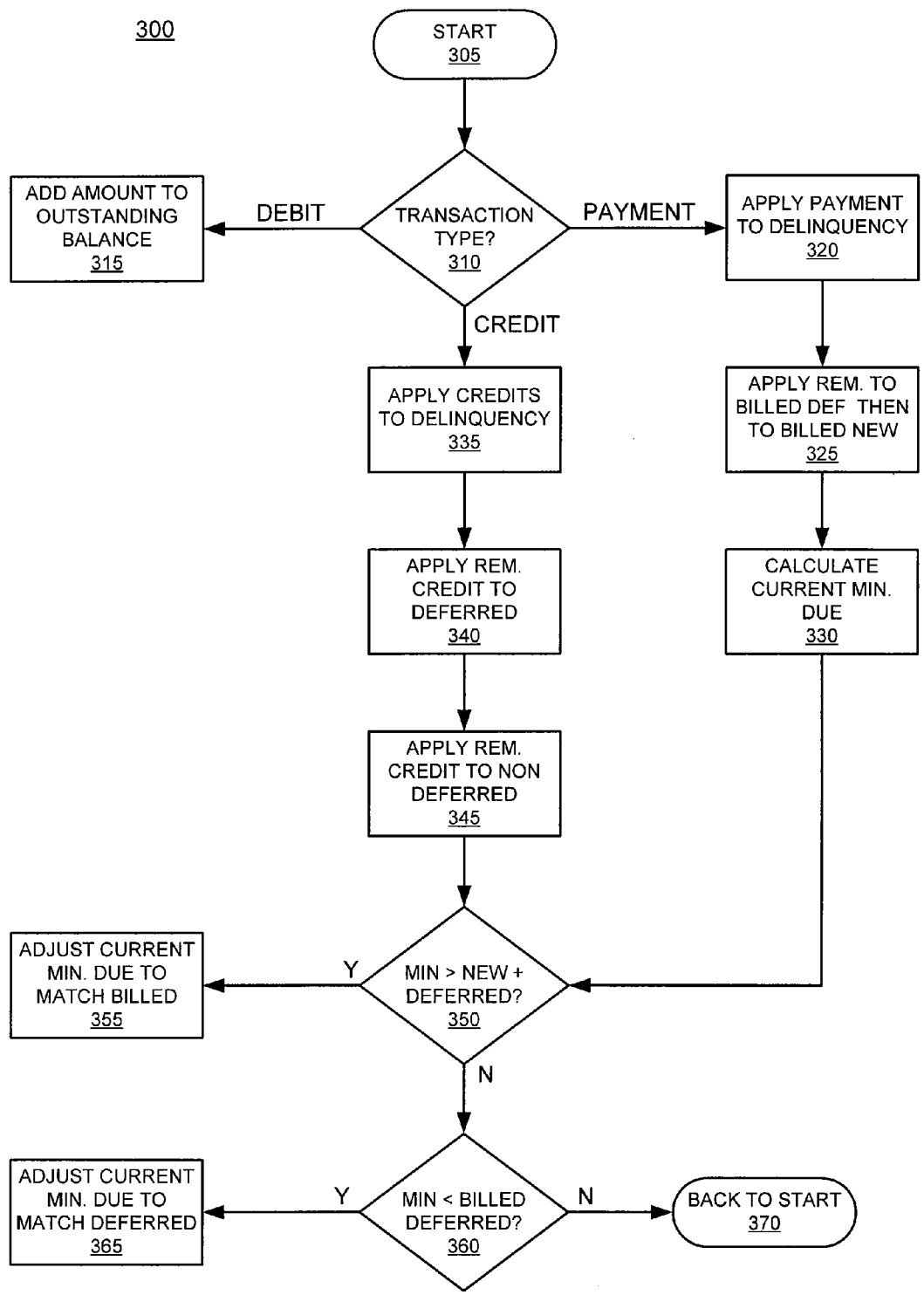

When payments are deferred as described above, posting activities should be modified in light of the differences between delinquent accounts and deferred payments. Referring to FIG. 3, the posting process (step 305) begins with a determination of a transaction type (step 310). If the transaction is a debit transaction (i.e., a charge card purchase), then the transaction amount is added to an outstanding balance, a cycle-to-date balance, and current balance within AR database 140.

When the transaction type is a credit transaction (e.g., a returned item), then the full credit amount is used to offset a delinquency amount if present (step 335). If there is no delinquent amount or if the credit is more than the amount needed to settle a delinquency, the remaining credit amount is applied to a deferred balance, if one exists. CIS 160 then subtracts 100% of the amount applied to the deferred balance from the current amount due (step 340). If any portion of the credit remains, the credit portion is applied to a non-deferred balance (step 345). This credit portion may be multiplied by the account's defer pay option due rate that is used to calculate the current defer pay option amount due in the prior cycle (e.g. 10% or 100%) and is subtracted from the current minimum payment due.

When the transaction type is a payment, then the payment amount is applied to offset any delinquency that may be present (step 320). If there is presently no delinquency or if the payment amount exceeds the delinquency amount, then the remaining payment amount is used to first, offset a billed deferred amount, and second, to a new deferred amount (step 325). CIS 160 combines the amount deferred to the billed deferred and new deferred and offsets the minimum due by the sum of the two.

Whether the transaction type (step 310) is a credit or a payment, CIS 160 performs a consistency check to adjust the current minimum due. If the current minimum due is greater than the sum of the new minimum due and the deferred amount (step 350), then the current minimum due is adjusted to match the total amount billed (step 355). A check is then performed to determine if the current minimum due is less than the billed deferred amount (step 360, then the current minimum due is adjusted to match the deferred amount (step 365).

A third payment term option is to submit a Standard Payment, which allows a consumer to pay a new balance in full by a pre-defined number of days after a statement cycle is cut. Practitioners will appreciate that various card issuers process "standard" payments in a variety of ways. Such standard processing may include, for example, processing payments that are required to pay the full account balance within 30 days, payments made over time with a minimum amount due each month, assessing an interest charge on an unpaid balance, and the like.

The unique combinations of features of the present invention, as described above, have been shown in research to attract net new small business consumers to a transaction card company. A transaction card company can also expect incremental charge volume from additional usage. Merchants can better manage Days Sales Outstanding (DSO) as well as collection risk by encouraging consumers to put more purchases on the transaction account of the present invention. Additionally, for those merchants who were previously offering discount terms for payment on check or cash, they can forego the terms by accepting the account of the present invention instead.

Consumers are better able to manage variable cash flow conditions by utilizing the two features of the invention (i.e., early and deferred payments). For example, the Early Payment Discount provides a discount off of the current bill that can be invested back into the consumer's business. The Defer Payment feature allows the consumer to defer payment of large purchases, during a slow month or as a financial management strategy, for an additional billing cycle (total grace is up to 90 days on new purchases). This invention also permits a transaction account company to offer a new product and service that will ultimately attract new card accounts and drive increased charge volume.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:

1. A computer-implemented method comprising:
   receiving, by a computer-based system for processing early payments to an account, a payment in response to a billing statement associated with said account, wherein said billing statement is associated with a billing cycle and a current spend, wherein said current spend is associated with a value of transactions on said account during said billing cycle;
   determining, by said computer-based system, that said payment is an early payment based on an early payment date;
   retrieving, by said computer-based system, a discount rate, wherein said discount rate is determined by comparing an amount of eligible spend and said current spend to an early payment tier, wherein said discount rate varies based on said amount of eligible spend;
   calculating, by said computer-based system, an early payment credit for said account, based on said eligible spend and said discount rate;
   posting, by said computer-based system, said early payment credit to said account in response to said early payment being received; and
   adding, by said computer-based system, said early payment credit to a cycle-to-date amount including a previously issued early payment credit.

2. The method of claim 1, wherein said early payment tier is based on at least one of: a payment amount, said current spend, a payment date, a merchant identifier, an industry code, a location or region associated with a purchase, a transaction amount, a spend trend, a merchant relationship, a status of a consumer associated with said account, a status of said account, an affiliation with an organization, a product held by said consumer, a timing of said payment, time period for a purchase, a payment method, a participation in a program, a length of relationship between said consumer and said account, and a credit rating of said consumer.

3. The method of claim 1, further comprising deducting said early payment credit from a future billing statement.

4. The method of claim 1, further comprising adjusting the discount rate based on at least one of: spend within an item classification, spend for a specific item, spend at specific vendors, spend within a defined geographical area, spend within a consortium of merchants, a payment amount, a spend amount, a payment date, a merchant identifier, an industry code, a location or region associated with a purchase, a transaction amount, a spend trend, a merchant relationship, a status of a consumer associated with said account, a status of said account, an affiliation with an organization, a product held by said consumer, a timing of said payment, time period for a purchase, a payment method, a participation in a program, a length of relationship between said consumer and said account, and a credit rating of said consumer.

5. The method of claim 1, further comprising determining that said eligible spend from said account qualifies for said discount rate.

6. The method of claim 5, wherein said determining that said eligible spend qualifies comprises subtracting suspense from an outstanding balance.

7. The method of claim 1, wherein said early payment date is static.

8. The method of claim 1, wherein said early payment date is determined based on at least one of: an amount of spend during a previous cycle, said discount rate applied to said account during a previous cycle, a previous payment date, a previous payment amount, an account balance, a payment history, a payment amount, a spend amount, a payment date, a merchant identifier, an industry code, a location or region associated with a purchase, a transaction amount, a spend trend, a merchant relationship, a status of a consumer associated with said account, a status of said account, an affiliation with an organization, a product held by said consumer, a timing of said payment, time period for a purchase, a payment method, a participation in a program, a length of relationship between said consumer and said account, and a credit rating of said consumer.

9. The method of claim 1, wherein said receiving said payment comprises receiving said payment which is less than a total amount due on said billing statement.

10. A system comprising:
    a processor for processing early payments to an account,
    a tangible, non-transitory memory configured to communicate with the processor,
    the tangible, non-transitory memory having instructions stored thereon that, in response to execution by the processor, cause the processor to perform operations comprising:

receiving, by said processor, a payment in response to a billing statement associated with said account, wherein said billing statement is associated with a billing cycle and a current spend, wherein said current spend is associated with a value of transactions on said account during said billing cycle;

determining, by said processor, that said payment is an early payment based on an early payment date;

retrieving, by said processor, a discount rate, wherein said discount rate is determined by comparing an amount of eligible spend and said current spend to an early payment tier, wherein said discount rate varies based on said amount of eligible spend;

calculating, by said processor, an early payment credit for said account, based on said eligible spend and said discount rate; and, posting, by said processor, said early payment credit to said account in response to said early payment being received; and adding, by said processor, said early payment credit to a cycle-to-date amount including a previously issued early payment credit.

11. The system of claim 10, wherein said early payment tier is based on at least one of: said eligible spend, said current spend, a payment amount, a spend amount, a payment date, a merchant identifier, an industry code, a location or region associated with a purchase, a transaction amount, a spend trend, a merchant relationship, a status of a consumer associated with said account, a status of said account, an affiliation with an organization, a product held by said consumer, a timing of said payment, time period for a purchase, a payment method, a participation in a program, a length of relationship between said consumer and said account, and a credit rating of said consumer.

12. The system of claim 10, wherein said operations further comprise deducting, by said processor, said early payment credit from a future billing statement.

13. The system of claim 10, wherein said operations further comprise adjusting, by said processor, the discount rate based on at least one of: said current spend, spend within an item classification, spend for a specific item, spend at specific vendors, spend within a defined geographical area, spend within a consortium of merchants, a payment amount, a spend amount, a payment date, a merchant identifier, an industry code, a location or region associated with a purchase, a transaction amount, a spend trend, a merchant relationship, a status of a consumer associated with said account, a status of said account, an affiliation with an organization, a product held by said consumer, a timing of said payment, time period for a purchase, a payment method, a participation in a program, a length of relationship between said consumer and said account, and a credit rating of said consumer.

14. The system of claim 10, wherein said operations further comprise determining, by said processor, that said current spend qualifies for said discount rate.

15. The system of claim 14, wherein said determining comprises subtracting suspense from said discount rate.

16. The system of claim 10, wherein said early payment date is static.

17. The system of claim 10, wherein said early payment date is determined based on at least one of: said current spend, an amount of spend during a previous cycle, said discount rate applied to said account during a previous cycle, a previous payment date, a previous payment amount, an account balance, a payment history, a payment amount, a spend amount, a payment date, a merchant identifier, an industry code, a location or region associated with a purchase, a transaction amount, a spend trend, a merchant relationship, a status of a consumer associated with said account, a status of said account, an affiliation with an organization, a product held by said consumer, a timing of said payment, time period for a purchase, a payment method, a participation in a program, a length of relationship between said consumer and said account, and a credit rating of said consumer.

18. The system of claim 10, wherein said receiving said payment comprises receiving said payment which is less than a total amount due on said billing statement.

19. An article of manufacture including a non-transitory, tangible computer readable storage medium having instructions stored thereon that, in response to execution by a computer-based system for processing early payments to an account, cause the computer-based system to perform operations comprising:

receiving, by said computer-based system, a payment in response to a billing statement associated with said account, wherein said billing statement is associated with a billing cycle and a current spend, wherein said current spend is associated with a value of transactions on said account during said billing cycle;

determining, by said computer-based system, that said payment is an early payment based on an early payment date;

retrieving, by said computer-based system, a discount rate, wherein said discount rate is determined by comparing an amount of eligible spend and said current spend to an early payment tier, wherein said discount rate varies based on said amount of eligible spend;

calculating, by said computer-based system, an early payment credit for said account, based on said eligible spend and said discount rate;

posting, by said computer-based system, said early payment credit to said account in response to said early payment being received; and adding, by said computer-based system, said early payment credit to a cycle-to-date amount including a previously issued early payment credit.

* * * * *